United States Patent [19]

Rokujio et al.

[11] 4,404,457
[45] Sep. 13, 1983

[54] WELDING CORE WIRE SUPPLY DEVICE

[75] Inventors: Masaharu Rokujio, Yamato; Takaaki Ogasawara, Kamakura; Mitunori Usui, Fujisawa, all of Japan

[73] Assignee: Kobe Steel, Ltd., Kobe, Japan

[21] Appl. No.: 372,397

[22] Filed: Apr. 27, 1982

Related U.S. Application Data

[63] Continuation of Ser. No. 77,268, Sep. 20, 1979, abandoned.

[30] Foreign Application Priority Data

Sep. 21, 1978 [JP] Japan ................. 53/130988

[51] Int. Cl.³ .............................. B23K 9/12
[52] U.S. Cl. ................. 219/137.2; 219/136; 219/137.63; 219/137.7; 219/137.71; 228/33
[58] Field of Search ............... 219/136, 137.2, 137.71, 219/137.7, 137.9, 137.63, 137.44; 228/244, 33; 314/69, 68

[56] References Cited

U.S. PATENT DOCUMENTS

| | | | |
|---|---|---|---|
| 2,806,125 | 9/1957 | Miller | 219/137.7 |
| 3,619,553 | 11/1971 | Wilkens | 219/137.7 |
| 3,629,547 | 12/1971 | Kester | 219/137.9 |
| 3,630,425 | 12/1971 | Wilkens | 314/69 |
| 3,744,694 | 7/1973 | Karnes et al. | 74/25 |

FOREIGN PATENT DOCUMENTS 1937240 1/1970 Fed. Rep. of Germany ................. 219/137.44

*Primary Examiner*—C. C. Shaw
*Attorney, Agent, or Firm*—Oblon, Fisher, Spivak, McClelland & Maier

[57] ABSTRACT

A welding core wire supply device comprises a conduit containing a welding core wire guide tube, a control cable, a power cable and so forth therein and having connectors at its both ends, a given number of supply units each having a supply section for leading and supplying a welding core wire to a desired zone of the conduit, and a power unit. The plurality of supply units are serially connected to the power unit through said connectors. Each supply section comprises at least a pair of rollers for drawing the welding core wire therebetween, a pull motor for rotating the rollers, a control device for controlling the pull motor with constant torque and a circuit for turning on and off a power supply to the supply units in response to welding start, stop and inching signals.

1 Claim, 4 Drawing Figures

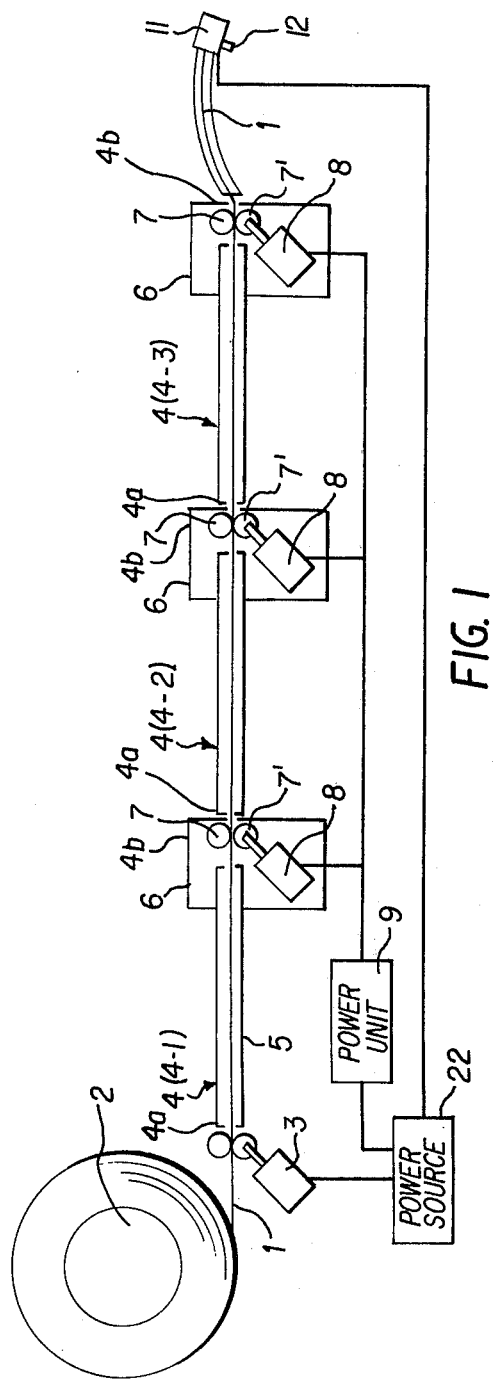
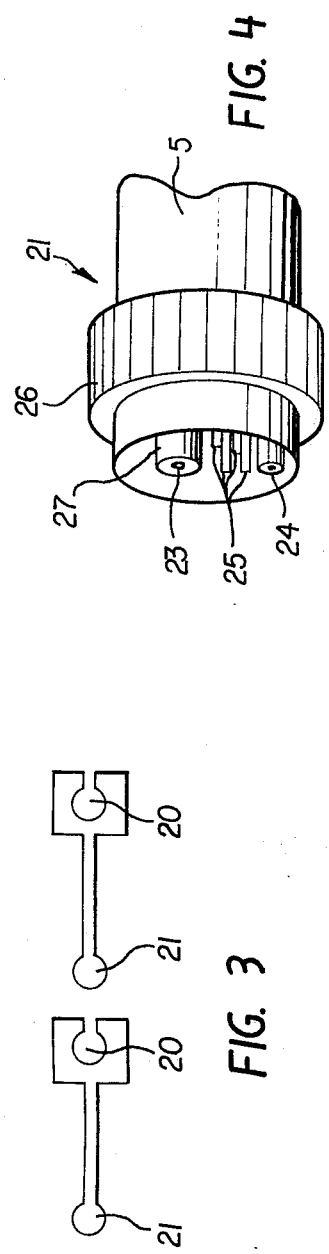
FIG. 1
FIG. 3
FIG. 4

WELDING CORE WIRE SUPPLY DEVICE

This is a continuation, of application Ser. No. 077,268, filed Sept. 20, 1979, now abandoned.

BACKGROUND OF THE INVENTION

1. Field of the Invention:

The present invention relates to a welding core wire supply device, and more particularly a supply device in which a conduit and a core wire supply zone are incorporated into a single unit and a welding core wire may be fed smoothly to wherever welding takes place by a series combination of those units.

2. Description of the Prior Art:

In the case where a welding core wire reel is far away from a welding point, a conventional way of smoothly feeding a welding core wire is a so-called push-pull supply method which includes a push motor on the reel side and a pull motor on the welding point side. While the push-pull method can accomplish the primary object of feeding the welding core wire over a longer distance, it suffers from considerable disadvantages in that the motors become larger and the supply sections at the welding point side become heavier and more bulky when the distance increases.

Moreover, in the conventional push-pull method, it is difficult to alter the feeding distance after settings.

SUMMARY OF THE INVENTION

It is therefore an object of the present invention to provide a welding core wire supply device in which a plurality of supply units each having a supply section including a conduit of a given length, a small capacity motor, a supply roller, etc. are properly connected to reduce size and weight requirements for the motor on the welding point side, ensure easy manipulation and allow flexibility in selecting the remote distance.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is a schematic diagram of one embodiment of the present utility model;

FIG. 3 is an example of a connector; and

FIG. 4 is a detailed diagram of the illustrative connector.

DETAILED DESCRIPTION OF THE PREFERRED EMBODIMENTS

Figure 2:
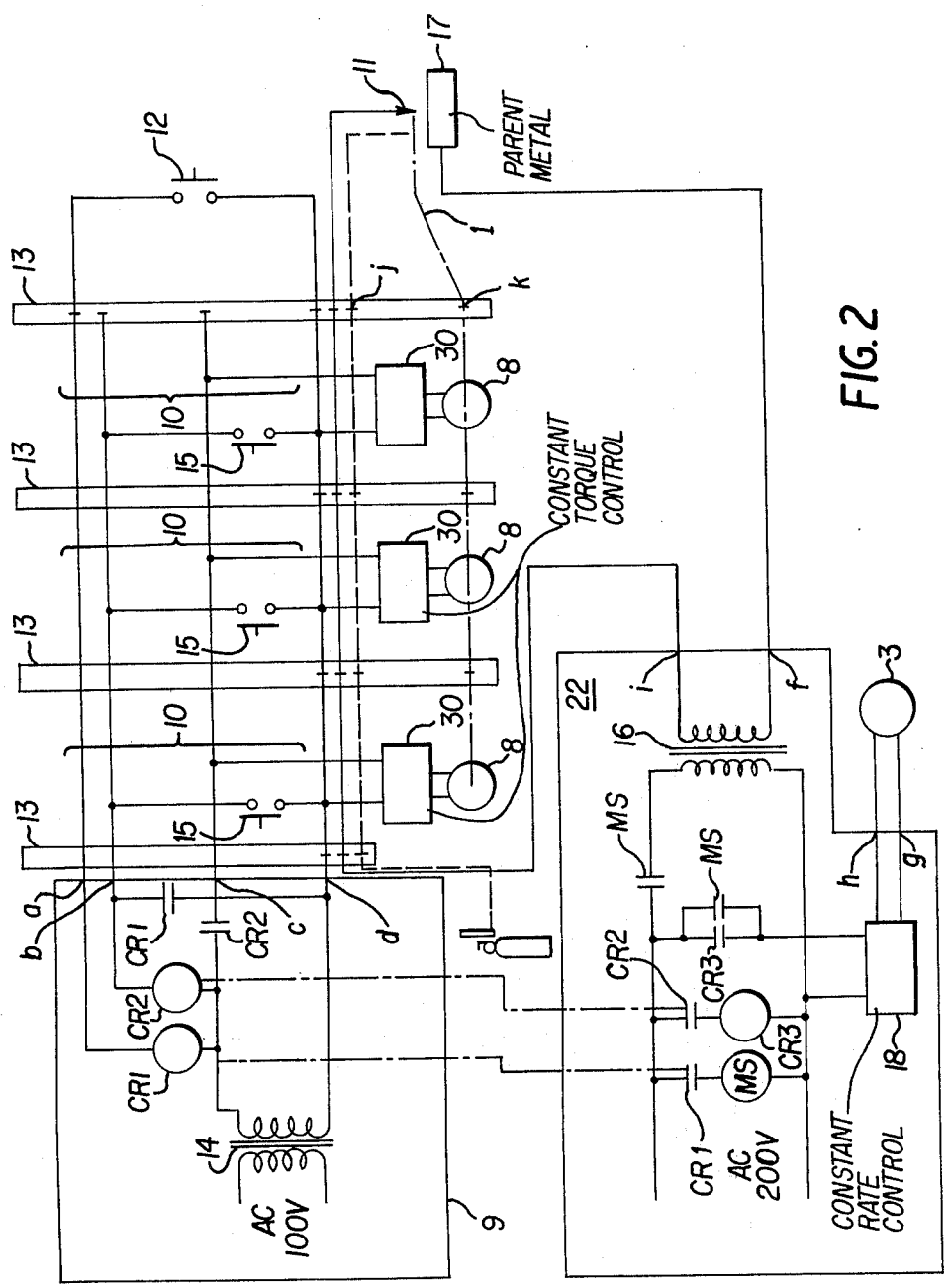
FIG. 2 is an electrical wiring diagram of an electric circuit used with the embodiment of FIG. 1.

One embodiment of the present utility model will now be discussed by reference to the drawings.

A welding core wire 1 is wound around a core wire reel 2 which is rotated at a constant rate to permit the protruding of the welding core wire 1 by a push motor 3.

Each of the identical core wire supply units 4 includes a conduit 5 of a given length within which the welding core wire 1 is inserted, a supply section 6 for drawing and guiding the welding core wire 1 into the next succeeding supply unit and a connector connecting the two adjacent units. The supply sections 6 each comprise a pair of guide rollers 7 and 7' for rotating the welding core wire 1 therebetween, a pull motor 8 for driving the guide rollers 7 and 7' with constant torque and a control 30 (FIG. 2) for controlling the pull motor 8 with constant torque.

A power unit 9 has a control circuit for turning on and off a power supply to the push motor 3 and respective pull motors 8 and a motor power supply as shown in FIG. 2. A commercial, or otherwise available, welding power source is labeled 22.

The power sources, input and output lines 10 of the control circuit, a gas hose and a core wire guide are connected together and the two adjacent units are connected serially via connectors 13 (FIG. 2) to extend the overall length. A connector plug, as depicted in detail in FIG. 4, includes a connector 21, a core wire guide 23, a gas hose 24, a control cable 25, a fastening jig 26 and a power pin 27.

The welding core wire 1 is fed from the last stage supply unit to a welding torch 11 on which welding takes place in the same manner as in the conventional push-pull method.

The circuit of FIG. 2 operates as follows:

In FIG. 2, a torch switch 12 associated with the welding torch 11 is connected via the connectors 13 of the respective supply units 4 and the leads 10 to a relay $CR_1$ in the motor power supply unit 9, including transformer 14 for a 100 V motor power source, and one terminal of the power source 9.

A push button switch 15 is provided for each respective one of the supply units 4 and is connected to a relay $CR_2$ via the respective connectors 13.

A relay MS and a transformer 16 are provided to enable the welding power source and an inching relay is labeled $CR_3$, both of which are connected to the 200 V welding power source through relays $CR_1$ and $CR_2$.

An input and an output of the connector 13 are provided at an inlet 4a and an outlet 4b of each of the supply units 4 and the respective supply units 4 are connected to one another via the connection leads 10.

In the circuit of FIG. 2, terminals a,b,c, and d of the power unit 9 are connected to the input side connector 13 of the closest supply unit 4-1 of the core wire reel 2 and the torch switch 12 is connected to the output side connector 13 of the last stage supply unit 4-3.

An output terminal i of the welding transformer 16 is connected via the welding torch 11 to the welding core wire 1 with the other terminal f being connected to a welding parent metal 17. Output terminals g and h of a constant rate control 18 are connected to the push motor 3. A connection terminal of the gas hose is labeled j and a connection terminal of the core wire guide is labeled k.

It is desirable that the input side 20 and the output side 21 of the connector be of the same shape as viewed from FIG. 3.

With the above discussed supply device, when the torch switch 12 is turned on, the relays $CR_1$, $CR_2$ and $CR_3$ are energized so that the push motor 3 starts rotating at a constant rate and the respective pull motors 8 start rotating with constant torque. The guide rollers 7 and 7' of the respective supply units 4-1 through 4-3 protrude the welding core wire 1, which runs through the respective conduit 5 and reaches the welding torch 11. Voltage is supplied to the welding transformer 16 and is connected to the welding torch 11 via the power pin 27 so that the welding core wire 1 is supplied with that voltage necessary to initiate the welding procedure.

Upon depression of the inching push button switch 15 of any supply unit 4, the relays $CR_2$ and $CR_3$ are energized to rotate the pull motors 8 of the respective supply units 4 and the push motor 3 for the core wire reel 2. There is nothing more necessary for the advancing movement of the welding core wire 1.

When the welding shop is remote from the core wire reel 1, the substantial length of the conduit is extended by connecting the input side 4a of additional supply units 4 to the output side 4b of the last stage supply unit 4. Conversely, when the welding shop is close to the core wire reel 2, a desired number of the supply units 4 are removed.

Since according to the present invention it is only necessary for the pull motors within the supply units to have a tensile force to draw the welding core wire of a length corresponding to the conduit length of the associated supply unit, it follows that the respective pull motors may be of a smaller capacity and the accessories about the welding torch may be smaller in size and lighter in weight, thus facilitating various manipulations for welding purposes such as the moving of the welding torch. Since the respective supply units each have constant torque control, there is no need to adjust balance between the respective units and only two leads are required within the control cable.

The greater or lesser number of the supply units may be connected depending upon whether the distance between the core wire reel and the welding point is long or short. The conduit can be of the optimum length according to the distance and need not be bent. No undesirable load works are placed on the welding core wire, thus facilitating welding procedures.

In the case where a plurality of the supply units are connected together, the pull motors in the respective supply units exert tensile force thoughout the welding core wire. Accordingly, no stress is applied to the welding core wire, thereby stabilizing the feeding operation, unlike the prior art wherein the welding core wire drawn only at the terminal.

Desirably, a commercially available welding power source is applicable to the present device when the input and output terminals are attached to the power unit.

The present invention is further applicable to shield gas arc welding provided that each of the respective supply units is provided with a shield gas supply tube and a connection port.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A welding core supply apparatus comprising:
   a source of welding core wire;
   means for consuming said welding core wires;
   welding core wire conduit means extending between said source and said means for consuming and adapted to enclose said welding core wire, said conduit means comprising at least two conduit sections serially releasably connected together by releasable connecting means at the ends of each said section, each of said conduit sections containing at least one pair of positively driven rollers for advancing said welding core wire through said conduit means, wherein each of said conduit sections also houses a welding core wire guide tube section, a contol cable section, and a power cable section, each of said housed sections including releasable connecting means on both ends for connecting said housed sections to the housed sections of adjacent conduit sections, whereby a desired number of conduit sections may be connected together and the core wire is smoothly transported through said conduit sections by said rollers in each sections;
   wherein each said conduit section includes a pull motor connected to said control cable section for rotating each of said pairs of rollers, each said pull motor including a constant motor torque control means;
   a power on-off circuit and an inching circuit associated with said control cable and power cable sections for controlling said pull motors;
   a pair of push rollers positioned between said source of welding core wire and any of said conduit sections for introducing said welding core wire into said conduit means;
   a push motor for rotating said push rollers; and
   push motor control means actuated by said power on-off circuit and said inching circuit.

* * * * *